Dec. 27, 1955  L. S. WILLIAMS  2,728,261
CUSTOMER INDICATING SCALE
Filed Sept. 3, 1952  6 Sheets-Sheet 2
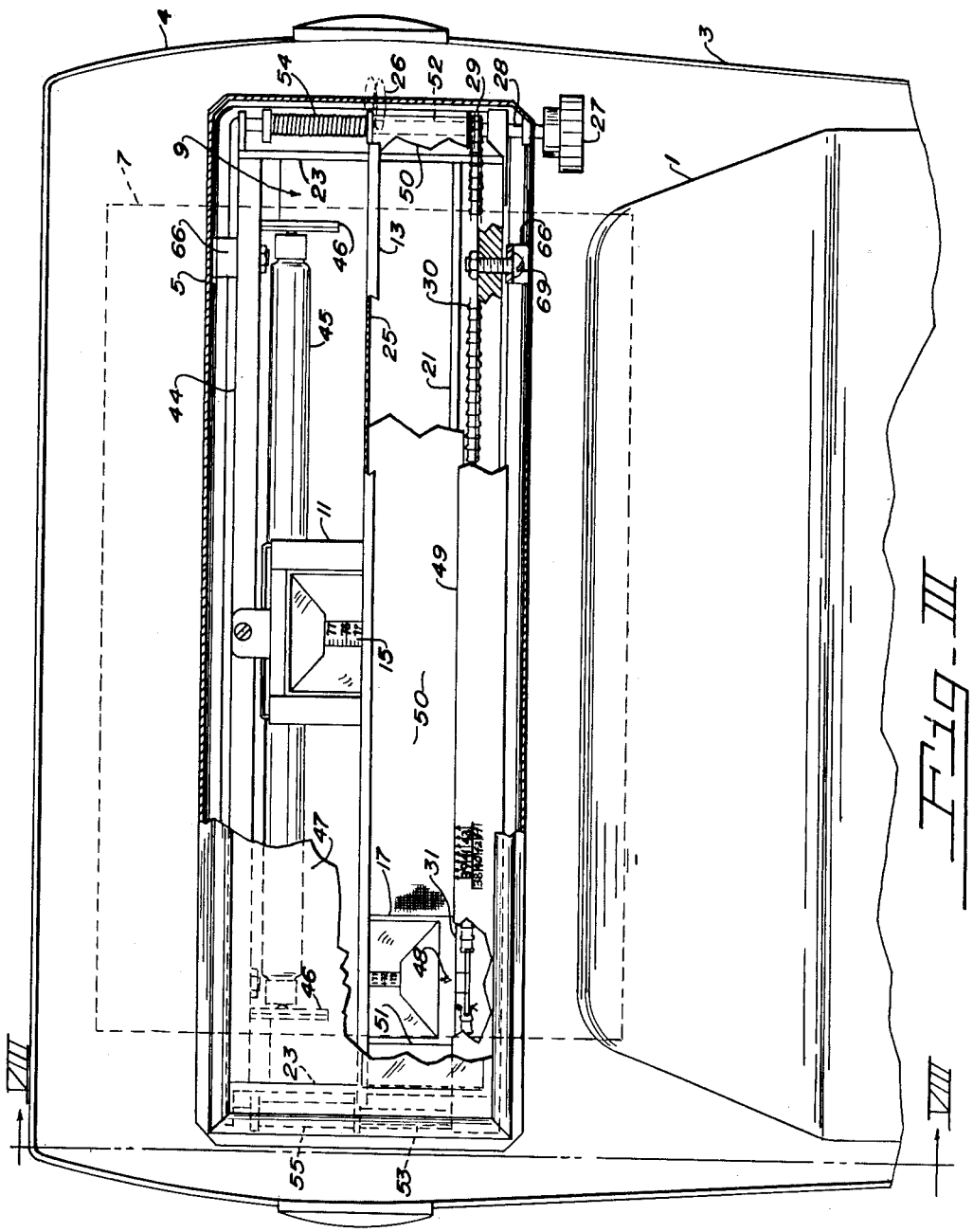
INVENTOR.
LAWRENCE S WILLIAMS
BY
Marshall Marshall & Yeating
ATTORNEYS Dec. 27, 1955     L. S. WILLIAMS     2,728,261
CUSTOMER INDICATING SCALE
Filed Sept. 3, 1952     6 Sheets-Sheet 3
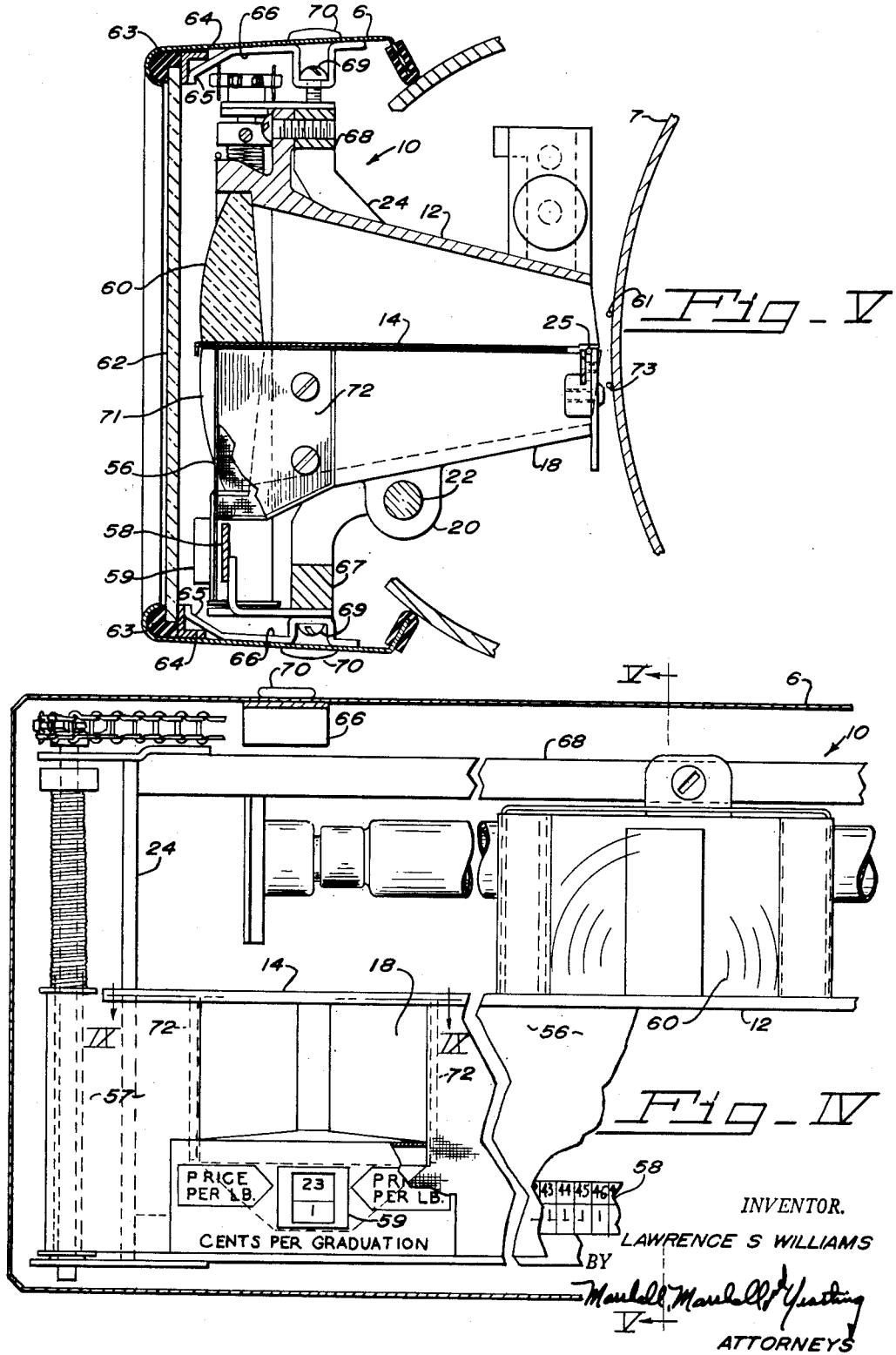
INVENTOR.
LAWRENCE S WILLIAMS
BY
ATTORNEYS

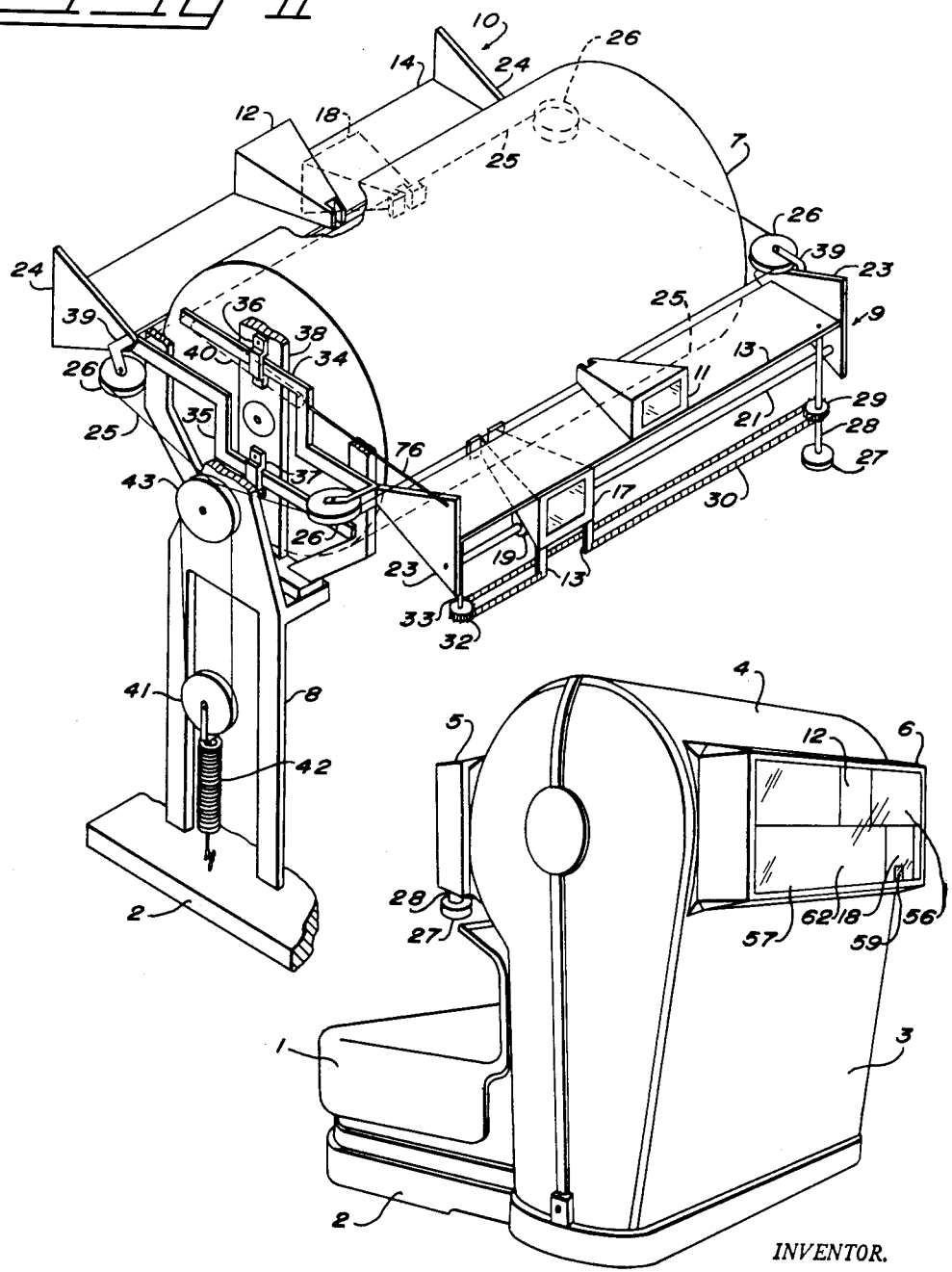

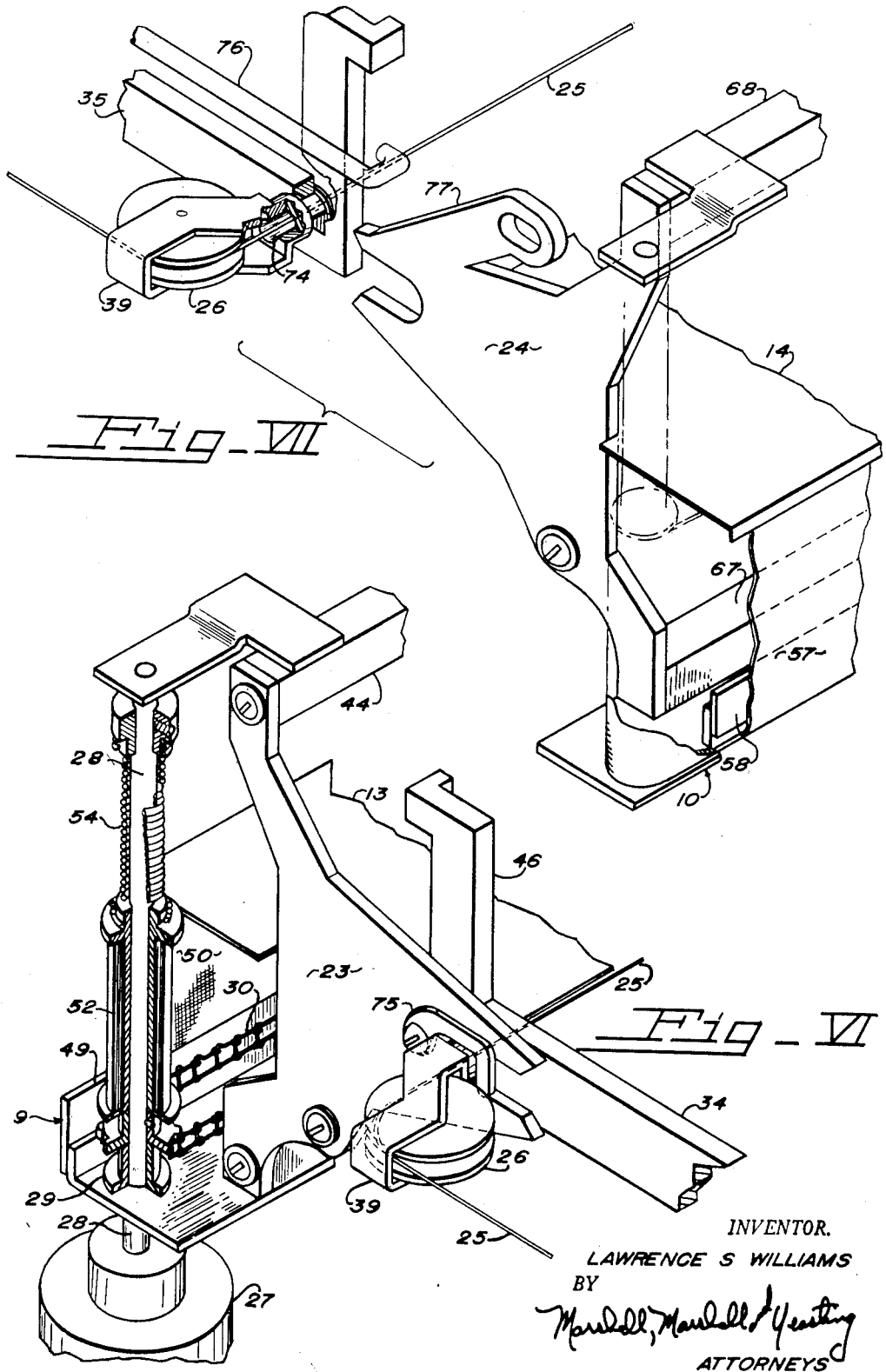

Dec. 27, 1955  L. S. WILLIAMS  2,728,261
CUSTOMER INDICATING SCALE
Filed Sept. 3, 1952  6 Sheets-Sheet 5
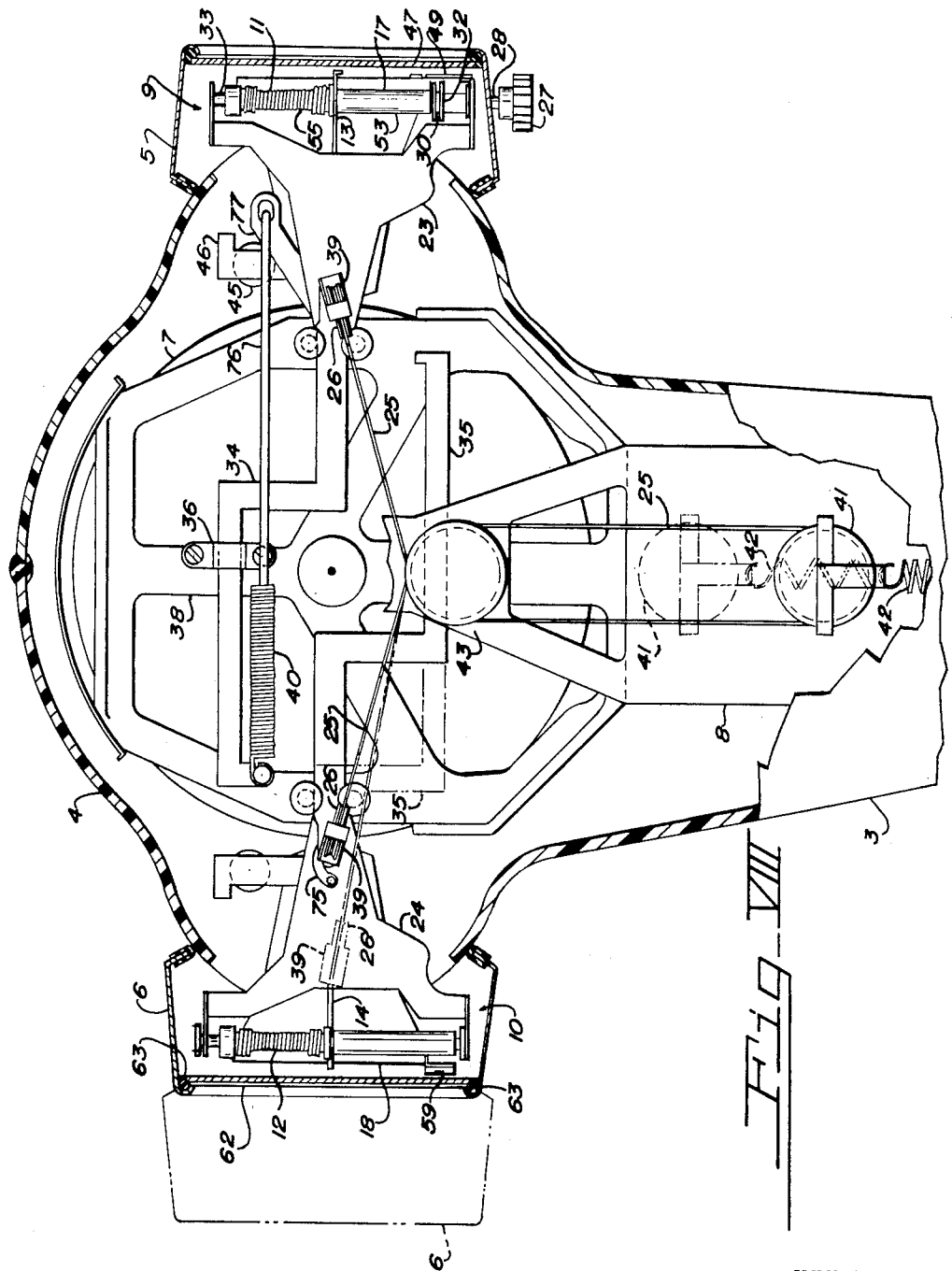
INVENTOR.
LAWRENCE S WILLIAMS
BY
Marshall, Marshall & Yeasting
ATTORNEYS

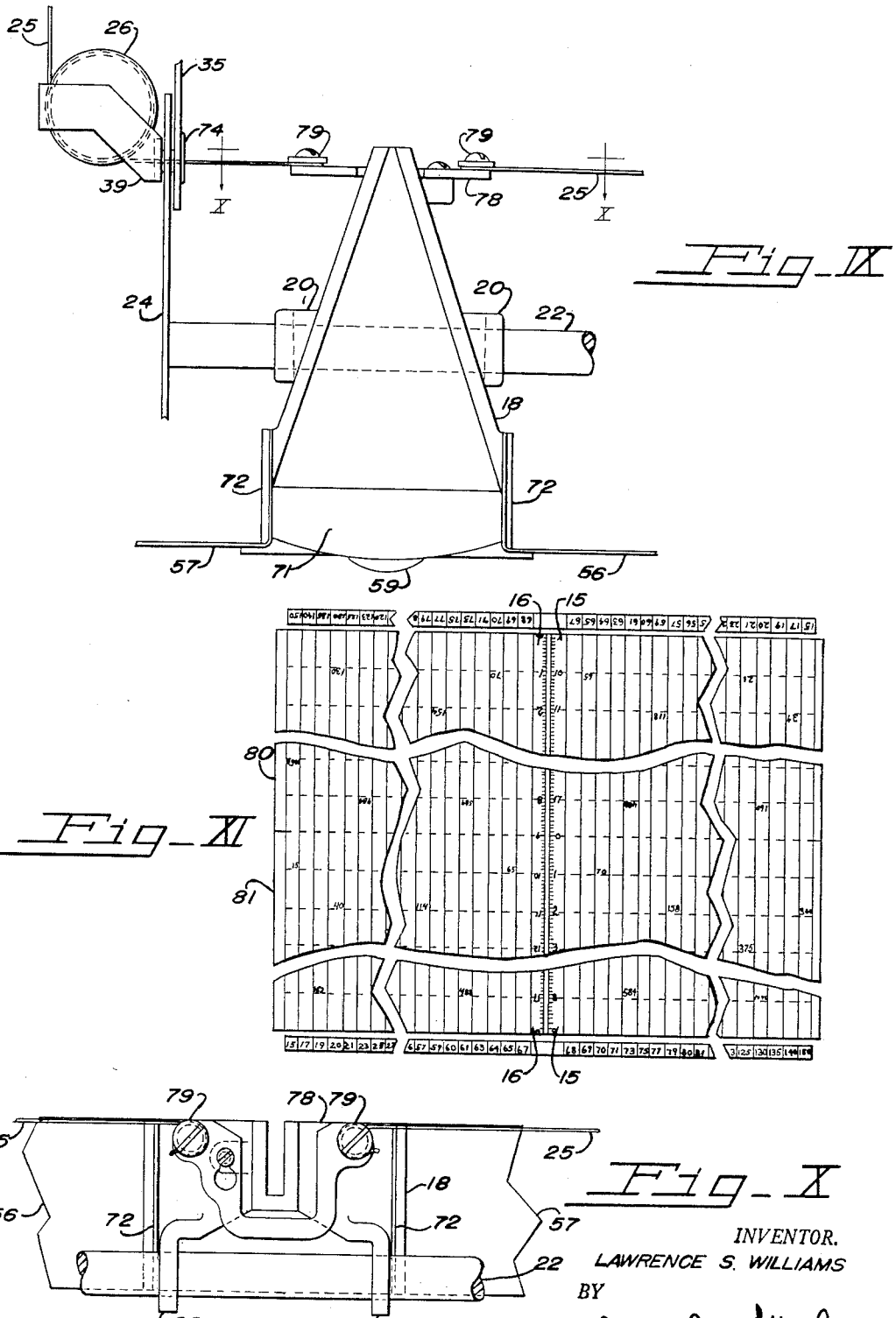

United States Patent Office 2,728,261
Patented Dec. 27, 1955

2,728,261

CUSTOMER INDICATING SCALE

Lawrence S. Williams, Toledo, Ohio, assignor to Toledo Scale Company, Toledo, Ohio, a corporation of New Jersey Application September 3, 1952, Serial No. 307,625

6 Claims. (Cl. 88—1)

This invention relates to weighing scales employed in the retailing of meat and grocery items, and in particular to a weighing scale adapted to provide indications of a commodity's weight, price and value for a merchant on one side of the scale and for his customers on the opposite side of the scale.

The principal object of this invention is to provide new and improved means for displaying clear, sharp, and highly visible indications of a commodity's weight, price and value for a merchant and his customers.

Another object of this invention is to provide improved means for extending a lens housing from the scale to permit access to its interior for facilitating the removal and replacement of parts.

Still another object of the invention is the provision of improved means for a quick, easy operation by a merchant of the indicating mechanism of a scale.

A further object is to provide indicia viewing apparatus on opposite sides of a scale which are so interconnected that positioning of the apparatus on one side of the scale automatically positions the apparatus on the opposite side of the scale.

More specifically, an object of the invention is to provide interconnected positionable lens cells on opposite sides of a scale chart, which cells cooperate with computed value indicia on the chart, and which cells are so interconnected that movement of one lens cell on one side of the chart causes a corresponding movement of the other lens cell on the opposite side of the chart.

Additional objects and advantages will be apparent from the following description in which reference is had to the accompanying drawings.

According to the invention, a weighing scale chart is provided with two sets of computed value indicia each extending circumferentially through approximately 180 degrees and thus occupying approximately half of the area of the chart. A horizontally positionable lens cell is provided on each side of the chart, one through which a merchant views indicia on the chart corresponding to the value of a commodity at a specified price, and the other through which a customer may view an identical reading of the commodity's value. The positionable lens cells are traversed along the chart by means manually operable by the merchant. A cord drive interconnects the two lens cells and passes horizontally around the chart on a plurality of pulleys. Movement of the lens cell through which the merchant views indicia on the chart causes a corresponding movement of the interconnected lens cell through which the customer may view an indication of the value of the commodity on the scale. At one side of the chart the cord drive passes around a resiliently mounted pulley to permit lens housings on opposite sides of the scale to be extended radially from the chart without disconnecting the cord drive interconnecting the lens cells. A stationary lens cell mounted on each side of the scale cooperates with a column of weight indicia on the chart to further provide an indication to a merchant and his customer of the weight of the commodity on the scale. Price indicia are provided on a stationary price chart located within the lens housing.

In the drawings:

Figure I is a perspective view of a weighing scale embodying the invention.

Figure II is a simplified isometric view of the scale shown in Figure I with the housing removed, taken from the corner diagonally opposite that from which Figure I is taken.

Figure III is an elevational view of the mechanism through which a merchant views indicia on the chart, parts being broken away and parts shown in section.

Figure IV is a fragmentary elevational view of the mechanism through which a customer may view an indication of the weight, price and value of the commodity on the scale.

Figure V is a view taken substantially along the line V—V of Figure IV, parts being broken away, and parts shown in section.

Figure VI is an isometric view of the mechanism for driving the movable lens cells along the chart, parts being broken away, and parts shown in section.

Figure VII is an isometric view of the means by which a lens track is connected to be pivotal on the scale.

Figure VIII is an elevational view in section taken substantially along line VIII—VIII of Figure III, parts being broken away.

Figure IX is a plan view taken substantially along line IX—IX of Figure IV, parts being broken away.

Figure X is a rear view of the movable lens cell illustrated in Figure IX, and is taken along line X—X of that figure, parts being broken away.

Figure XI is a simplified unrolled chart of the type employed in the instant invention illustrating the arrangement of computed value and weight indicia.

Referring to Figure I, a weighing scale embodying the invention includes a load receiver or platter 1 which overlies a forward portion of a base 2. An upright housing 3 erected from the rear portion of the base 2 and enclosing a load counterbalancing mechanism (not shown) includes an upright generally cylindrical housing portion 4. Mounted on opposite sides of the cylindrical housing portion 4 are lens housings 5 and 6. The lens housing 5 is located on the platter side of the scale, and houses apparatus through which a merchant may view indications of the weight, price and value of a commodity on the platter 1. The lens housing 6 houses similar apparatus through which may be viewed identical indications of the commodity's weight, price and value by the merchant's customers on the opposite side of the scale.

Referring now to Figure II a drum chart 7 is rotatably mounted on a pair of upright supports 8 mounted on the base 2 at each end of the scale within the upright housing 3. Lens tracks 9 and 10 are located within the housings 5 and 6 respectively and are each provided with a stationary and a movable lens cell. A pair of stationary lens cells 11 and 12 are mounted above dividers 13 and 14 of the lens tracks 9 and 10 respectively and cooperate with columns of indicia 15 and 16 (shown in Figure XI), to provide visual indications of the commodity's weight. It will be noticed in Figure XI that the columns of indicia 15 and 16 are offset from one another. Likewise, the stationary lens cells 11 and 12 on opposite sides of the chart are also offset to correspond with their respective column of weight indicia.

Movable lens cells 17 and 18 are positioned along the tracks 9 and 10 below the dividers 13 and 14. This arrangement of providing a stationary and a movable lens cell in different planes permits the movable lens to be shifted from one end of the lens track to the other without obstruction by the stationary lens cell. The movable lens cells 17 and 18 are each provided with a pair of depending ears 19 and 20 which form bearing surfaces for the movable lens cells to be slidably mounted on guide rods 21 and 22 fixed between pairs of end brackets 23 and 24 of the lens tracks 9 and 10. The lens cells 11, 12, 17 and 18 are all of a generally frusto-pyramidal shape and are further provided with magnifying lenses at their outer ends which provide enlarged images of the indicia on the chart 7.

A cord drive 25 is connected to the ends of the movable lens cells 17 and 18 adjacent the chart 7 and passes around the chart on a plurality of pulleys 26. By interconnecting the lens cells 17 and 18 in this manner, movement of one lens cell along its track causes a like movement of the other lens cell along its track. Both lens cells 17 and 18 are therefore traversed along the chart 7 when the merchant turns a drive knob 27 fixed to the lower end of a shaft 28 mounted on one end of the lens track 9. The shaft 28 carries a drive sprocket 29 which cooperates with a ladder chain 30 which in turn has its ends attached to downwardly extending arms 31 at the outer end of the lens cell 17. The chain 30 also passes around a freely rotating sprocket 32 fixed to the end of a shaft 33 mounted on the end of the lens track 9 opposite that on which the shaft 28 is mounted.

The lens tracks 9 and 10 are pivoted upon the ends of pairs of extensible bars 34 and 35 respectively. The bars 34 on each side of the chart 7 are slidable in brackets 36 fixed to short pedestals 38 surmounting each of the upright supports 8. The bars 35 are slidably mounted in brackets 37 also fixed to the pedestals 38. The ends of the bars 34 and 35 at which the lens tracks 9 and 10 pivot are provided with brackets 39 which support the pulleys 26 around which the cord drive 25 travels. A tension spring 40 is connected between the innermost end of one of the bars 34 which carries one end of the lens track 9 and the corresponding end bracket 23 of the lens track 9. The tension spring 40 acts as a balance for the lens track to permit it to be pivoted and be retained in balance in its various pivoted positions. The lens track 10 and one of the bars 35 to which it is pivotally attached are connected by a similar tension spring (not shown) which serves the same purpose for the lens track 10 as does the tension spring 40 for the lens track 9.

At the left side of the scale as viewed from the merchant's stance and adjacent the upright support 8 is mounted a resilient pulley 41 which is fastened to the base 2 by means of a spring 42. Spaced above the pulley 41 is a second pulley 43 which is mounted to be rotatable on a short shaft fixed in an upper portion of the upright support 8. The cord drive 25 which passes around the pulleys 26 mounted on the ends of the pairs of bars 34 and 35 also passes around the pulley 43, then downwardly and around the resilient pulley 41. This arrangement permits the lens tracks 9 and 10 to be extended radially with respect to the chart 7 without necessitating removal of the cord drive 25 from the interconnected movable lens cells 17 and 18.

When it is desired to gain access to parts within one of the lens housings 5 or 6, the housing and the attached lens track need merely be pulled outwardly away from the chart 7. The bars to which the end brackets of the lens track are attached will slide and be guided in their brackets fixed to the pedestals 38. The pulleys 26 move along with the lens track and cause the cord drive 25 passing around the pulleys to be extended. This extension of the cord drive 25 causes the resiliently mounted pulley 41 to move upwardly toward the pulley 43. The spring 42 extends with movement of the pulley 41 and acts to return the resiliently mounted pulley 41 to its original position when the lens track is replaced. It can be seen therefore that the cord drive 25 need not be adjusted after a lens track has been extended and replaced in its original position, since it was not disconnected from the lens cells.

Referring to Figure III, the lens housing 5 through which the merchant views indicia indicative of the weight, price and value of a commodity on the platter 1 contains the stationary lens cell 11 and the movable lens cell 17 which are separated in elevation by the divider 13. The stationary lens cell 11 is located substantially halfway between the ends of the housing 5 and is fixed to a support bar 44 mounted between the end brackets 23 of the lens track 9. A fluorescent light 45 is positioned above and behind the stationary lens cell 11 with its ends supported by upwardly directed arms 46 of the extensible bars 34. (See Figure VIII.) The light 45 illuminates the chart 7 to provide a clear, sharp image of the indicia viewed through the lens cells 11 and 17.

The lens housing 5 is covered at its forward end by a window 47. The upper half of the window 47 forward of that portion above the divider 13 is opaque except for the small portion forward of the lens cell 11. Since it is desirable to view only the indicia corresponding to the weight of the commodity as seen through the lens cell 11, the opacity of the upper half of the window prevents the merchant from being distracted by value indicia on the chart which are not desired to be seen.

The movable lens cell 17 which is positioned by the ladder chain 30 driven by the sprocket 29 as the merchant rotates the drive knob 27 has an index 48 on its lower forward end which cooperates with price markings on a stationary price chart 49 fixed horizontally in a forward lower portion of the lens housing 5. The price markings extend across the price chart 49 to the limits of travel of the lens cell 17 and are selected to be of a range at which most meat and grocery items sell. When a merchant wishes to know the value of the commodity on the platter 1, he merely rotates the drive knob 27 to align the index 48 with the price marking on the price chart 49 at which the commodity sells, and views through the lens cell 17 the computed value of the commodity.

Curtains 50 and 51 extend from the sides of the lens cell 17 to the ends of the lens housing 5 and are wound onto take-up spools 52 and 53 resiliently mounted on the shafts 28 and 33. The spools 52 and 53 have their upper ends connected to springs 54 and 55 which are mounted over the shafts 28 and 33 with their ends opposite their ends which are attached to the spools 52 and 53 fixed to the shafts 28 and 33. By providing resilient curtain take-up members, the curtains 50 and 51 are always taut. As the lens cell 17 is positioned within the lens housing 5, one of the curtains 50 or 51 will be let out and the other curtain will be taken up on its spool.

Because of the curtains in the lower half of the lens housing 5 and the opacity of the upper half of the window 47, the only indicia which may be viewed by a merchant are the weight indicia viewed through the lens cell 11, the price markings along the chart 49, and the value indicia as viewed through the movable lens cell 17. The entire price chart 49 in the lens housing 5 is visible to the merchant. This allows the merchant to fix his attention on a certain price marking on the price chart 49 and then position the movable lens cell 17 accordingly.

Figure IV shows a portion of the lens housing 6 through which the merchant's customers view indications of the weight, price and value of the commodity. The arrangement of the mechanism located within the lens housing 6 is substantially similar to the arrangement of the mechanism located within the lens housing 5. The only important difference is that curtains 56 and 57 which correspond to curtains 50 and 51 in the lens housing 5 are wider than the second-mentioned curtains and lie forward of a stationary price chart 58 to hide all of that price chart except that portion visible through a magnifying lens 59 located in the lower forward portion of the movable lens cell 18. The curtain take-up mechanism housed within the lens houisng 6 operates in a manner similar to that in which the curtain take-up mechanism within the lens housing 5 operates.

Legends such as "Price Per Pound" and "Cents Per

Graduation" may be provided on the lower forward portion of the lens cell 18 adjacent the magnifying lens 59 to draw the customer's attention to those indications.

Referring to Figure V, the lens cell 12 (which is similar to the lens cell 11) is of a generally frusto-pyramidal shape and has an open bottom and converging side walls. A magnifying lens 60 is mounted in the larger end of the lens cell 12 and comprises an off-center section or portion of a spherical lens with a planar back section that is formed at an angle to the optical axis of the lens, the form of the lens being such that it acts as a combination magnifying lens and prism. The center line of the lens cell 12 is arranged to approximately coincide with a plane including a reading line 61 and extending perpendicular to the surface of the chart 7. A window 62 is held in place in the lens housing 6 against a soft rubber gasket 63 by a plurality of metal strips 64 inserted between the window and upturned points 65 of generally U-shaped attaching brackets 66 welded to the inside of the top and bottom of the lens housing 6. The shell of the lens housing 6 is advantageously attached to the supporting framework including support bars 67 and 68 by a plurality of screws 69 engaging the brackets 66 and the bars 67 and 68 and that are accessible through openings in the shell. The openngs are closed by snap buttons 70.

The lens cell 18 is open along its upper side where it abuts the divider 14, and has its depending ears 20 engaging the guide rod 22 mounted in the framework within the lens housing 6. A magnifying lens 71 is mounted in the larger end of the lens cell 18 and is retained in position by a pair of side plates 72 that are attached to the sides of the lens cell 18. The side plates 72 also act as fastening means for the ends of the curtains 56 and 57 attached to the lens cell 18. The lens 71, like the lens 60, is formed as a section of a spherical lens with a planar rear surface to which the optical axis of the lens is non-perpendicular and is mounted within the lens cell so that it acts as both a lens and prism. The lenses 60 and 71 are further oriented so that their optical axes, the paths of unrefracted light through the lens, intersect at the observer's eye level and each intersects the reading line associated therewith. A reading line 73 cooperates with the lens cell 18 to provide accurate indications of the computed value of the commodity.

The magnification of each of the lenses and its distance from the reading line is selected according to the desired magnification of the chart indicia, and the slopes of the sides of the lens cells are further selected so that when viewed through the lens the sides of the cells appear to be parallel or nearly so and to frame the associated columns of indicia.

The use of at least one lens that is formed to provide prismatic effect is necessary if the lenses are to be separated in elevation (to avoid interference as the second one is moved) and still keep each reading line centered in the field of view of the associated lens and the apparent viewing angle normal to the chart.

The end brackets which form the ends of the lens tracks are mounted to be pivotal on brackets at the ends of the extensible bars, which brackets also carry the pulleys 26. The lens tracks may be pivoted up or down within limits about an axis adjacent the reading lines. The cord drive 25 which passes through openings 74 (see Figure VII) in the brackets 39 passes through the axis on which the lens tracks may be pivoted. Therefore, pivoting of either of the lens tracks may be accomplished without destroying the accuracy of the readings.

It has previously been mentioned that the lens tracks may be extended radially from the chart to facilitate gaining access to parts within the lens housing without disconnecting the cord drive from the movable lens cells. This extension without disconnection is permitted by the resilient connection provided by the pulley 41 and the spring 42. On occasions, however, it may be necessary to fully remove the lens tracks. This is accomplished by pulling upwardly on a U-shaped latch 75 pivotally attached to the end brackets of the lens tracks (see Figure VI) which engages around a portion of the adjacent bracket 39, and at the same time at the opposite end of the lens track disengaging a hook 76 from an arm 77 formed on its corresponding end bracket. The hook is an extension of the tension spring which balances that particular lens track. (See Figure VII.) Although Figures VI and VII illustrate mechanisms which are located on opposite sides of the scale, it is to be understood that each of the mechanisms shown in the figures has a counterpart on the opposite side of the scale, i. e., the mechanism shown in Figure VI is found to be substantially the same in each of the lens housings 5 and 6, and the mechanism shown in Figure VII is also found in each of the lens housings 5 and 6. Each of the lens tracks is formed therefore at one end by mechanism substantially similar to that shown in Figure VI, and at the other end by mechanism substantially similar to that shown in Figure VII. If it is necessary to remove a lens track, the latch 75 and the hook 76 are disengaged and the end brackets of the lens track may be pulled outwardly from the scale. The only other connection is that of the cord drive 25 to the movable lens cell within the lens housing. By disconnecting the cord drive from the lens cell, the entire lens housing and the mechanism located therein may be removed from the scale.

In reference to Figure VIII, dotted lines illustrate the position of the lens housing 6, the extensible bars 35 and the resilient pulley 41 when the lens housing 6 has been extended to permit access for removal or replacement of parts, such as replacement of a light.

The means for attaching the cord drive to the movable lens cells is illustrated in Figures IX and X. A substantially U-shaped bracket 78 is fastened to the smaller end of the lens cell 18 and is provided on each end with screws 79 around which the ends of the cord drive may be wound and tightened.

A chart of the preferred type comprises two sets of columns of value indicia 80 and 81 each extending through 180 degrees of the chart circumference and thus occupying approximately half the area of the chart. The previously mentioned columns of weight indicia 15 and 16 extend entirely around the periphery of the chart, and in this instance are capable of indicating the weight of a commodity up to eighteen pounds. Since, however, each of the columns of value indicia viewed through the lens cells 17 and 18 extend over only half the area of the chart computed value may be seen only commodities weighing up to nine pounds or one-half the capacity of the scale. For commodities which weigh between nine and eighteen pounds, the value indicia on the other half of the chart will be seen in inverted position. Items weighing in excess of nine pounds are not often sold over the counter, therefore no inconvenience results from limiting value indications to loads of not more than nine pounds.

*Operation*

As a merchant places a commodity on the platter 1 of the scale he rotates the drive knob 27 to position the merchant's lens cell 17 along the price chart 49 to align the index 48 with the price marking at which the commodity sells. Positioning of the merchant's lens cell 17 causes a corresponding movement of the customer's lens cell 18 through the cord drive 25. The merchant may view the weight indication through the lens cell 11, the price at which the commodity sells on the price chart 49, and the value indication through the lens cell 17. Identical readings by a customer may be made through the lens cell 12, the magnifying lens 59 forward of the price chart 58, and the lens cell 18.

For removal or replacement of parts within either of the lens housings 5 and 6 the lens housings may be withdrawn radially from the chart, this withdrawal being permitted by extension of the cord drive 25 and the resilient pulley 41 and spring 42. The lens housing may then be replaced in its original position.

Various changes may be made in the details of construction and in the combination and arrangement of the several parts within the scope of the claims without departing from the spirit of this invention.

Having described the invention, I claim:

1. In a computed value weighing scale, in combination, a pair of spaced apart upright supports, a chart that is mounted for rotation between the supports and that has at least two sets of computed value indicia thereon, a pair of bars slidably mounted on each of the supports, the bars on each support extending to opposite sides of the support, a lens track connected to and extending between each pair of bars, a lens housing fixed to and partially enclosing each of the lens tracks, a lens cell carried on each of the tracks within the lens housing and movable along a path adjacent a side of the chart to view one of the sets of value indicia thereon, a cord drive interconnecting the lens cells, and a resiliently mounted pulley for carrying part of the cord drive to accommodate movement of either of the lens housings and the lens track and the lens cell therewithin radially of the chart without necessitating removal of the cord drive from the interconnected lens cells.

2. In a computed value weighing scale, in combination, a pair of spaced apart upright supports, a cylindrical chart that is mounted for rotation between the supports and that has two sets of computed value indicia each occupying approximately one-half of the area of the chart, a pair of bars slidably mounted on each of the supports, the bars on each support extending to opposite sides of the support, a lens track pivotally connected to each pair of bars and extending therebetween, the pivotal connection facilitating the reading of the scale from several elevations, a lens housing fixed to and partially enclosing each of the lens tracks, a lens cell carried on each of the tracks within the lens housing and movable along a path adjacent a side of the chart to view one of the sets of value indicia thereon, a spring acting between each of the pivotally connected lens tracks and one of the bars supporting that track for balancing the weight of the track and its associated lens cell and lens housing in its various pivoted positions, a cord drive interconnecting the lens cells, a resiliently mounted pulley for carrying part of the cord drive to accommodate movement of either of the lens housings and the lens track and the lens cell therewithin radially of the chart without necessitating removal of the cord drive from the interconnected lens cells.

3. A computed value weighing scale indicating system according to claim 2 in which the cord drive passes generally through the pivoting axes of the pivotally mounted lens tracks so that the position of the movable lens cells is independent of the degree of tilt of the lens tracks.

4. In a computed value weighing scale, in combination, a pair of spaced apart upright supports, a chart that is mounted for rotation between the supports and that has at least two sets of computed value indicia thereon, a pair of bars slidably mounted on each of the supports, the bars on each support extending to opposite sides of the support, a lens track connected to and extending between each pair of bars, a lens housing fixed to and partially enclosing each of the lens tracks, a lens cell carried on each of the tracks within the lens housing and movable along a path adjacent a side of the chart to view one of the sets of value indicia thereon, means for driving one of the lens cells to selected positions, a cord drive interconnecting the cells for driving the other lens cell to corresponding positions, pulleys carried on the ends of the bars to carry the cord drive, and a resiliently mounted pulley for carrying part of the cord drive to accommodate movement of either of the lens housings and the lens track and the lens cell therewithin radially of the chart without necessitating removal of the cord drive from the interconnected lens cells.

5. In a computed value weighing scale, in combination, a pair of spaced apart upright supports, a cylindrical chart that is mounted for rotation between the supports and that has two sets of computed value indicia each occupying approximately one-half of the area of the chart, a pair of bars slidably mounted on each of the supports, the bars on each support extending to opposite sides of the support, a lens track pivotally connected to each pair of bars and extending therebetween, the pivotal connection facilitating the reading of the scale from several elevations, a lens housing fixed to and partially enclosing each of the lens tracks, a lens cell carried on each of the tracks within the lens housing and movable along a path adjacent a side of the chart to view one of the sets of value indicia thereon, a spring acting between each of the pivotally connected lens tracks and one of the bars supporting that track for balancing the weight of the track and its associated lens cell and lens housing in its various pivoted positions, means for driving one of the lens cells to selected positions, a cord drive interconnecting the cells for driving the other lens cell to corresponding positions, pulleys carried on the ends of the bars to carry the cord drive, and a resiliently mounted pulley for carrying part of the cord drive to accommodate movement of either of the lens housings and the lens track and the lens cell therewithin radially of the chart without necessitating removal of the cord drive from the interconnected lens cells.

6. A computed value weighing scale indicating system according to claim 5 in which the cord drive passes generally through the pivoting axes of the pivotally mounted lens tracks so that the position of the movable lens cells is independent of the degree of tilt of the lens tracks.

References Cited in the file of this patent

UNITED STATES PATENTS

| 2,025,590 | Jaenichen et al. | Dec. 24, 1935 |
| 2,366,947 | Williams | Jan. 9, 1945 |